3,190,133
REVERSING CONTROL SYSTEM FOR A ROTARY
SHAFT
Jean Foufounis, 17 Ave. Dapples, Lausanne,
Vaud, Switzerland
Filed Apr. 8, 1963, Ser. No. 271,201
Claims priority, application Switzerland, Apr. 12, 1962,
4,494/62
3 Claims. (Cl. 74—204)

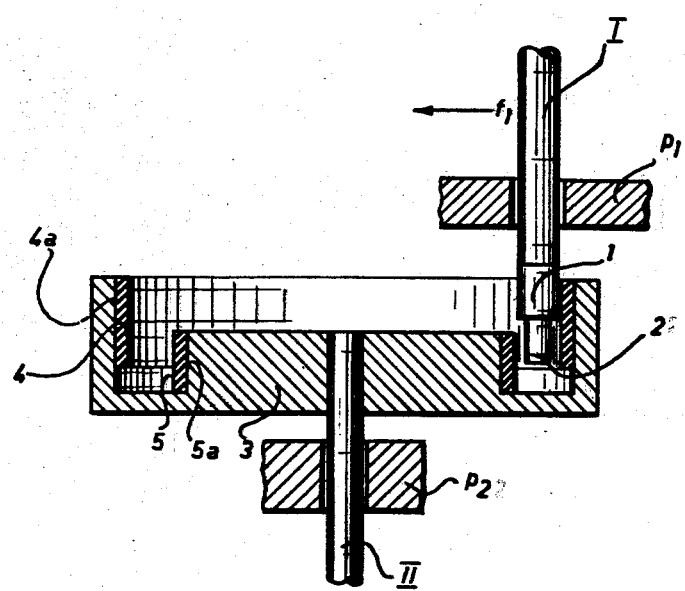
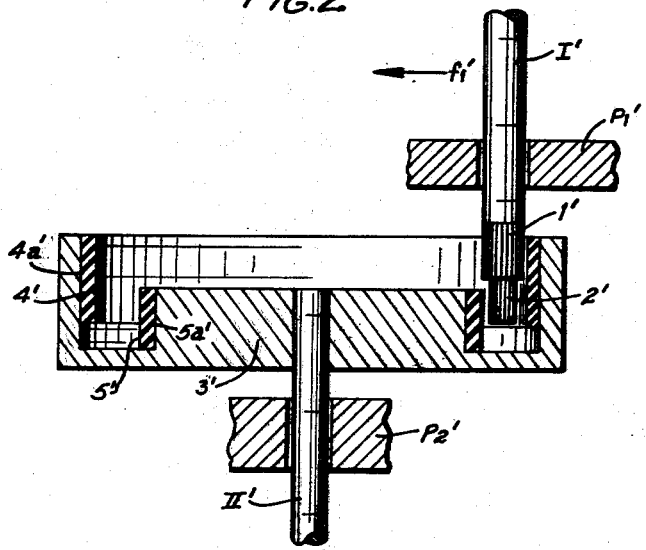

Various machines or mechanisms, for example automatic record carrying turntables wherein the part to be driven is to be rotated either in one direction or in the opposite direction but always at the same uniform speed, are known.

Reversible drive, in opposite directions, is generally obtained either by a reversible electric motor which is connected in two different ways with a network through a suitable switch according to the direction of rotation which is required, or else, by inserting, between a non-reversible motor and the part to be driven a mechanical reversing system including a gearwork carried by a plurality of reversible spindles.

Reversible motors, chiefly those which are to rotate accurately at a predetermined constant speed in both directions, are comparatively much more expensive than conventional electric motors and, furthermore, the high grade reversing switches required, and whether controlled manually or electrically, are expensive and their adjustment is often a delicate matter. The same is the case for mechanical reversing means which require frequent upkeep and inspection, all the more so when they are intricate. Moreover, cost is comparatively high by reason of the large number of different parts therein.

The invention has for a principal object an arrangement for controlling the direction of rotation of a shaft in which at least one driving shaft controls at least one driven shaft. The inventive arrangement eliminates the above-mentioned drawbacks.

According to the invention, one of the shafts is provided at an end with two wheels arranged coaxially with reference to the shaft. The other shaft carries a plate having a surface provided with a recess defining in said plate two cylindrical surfaces extending coaxially with the second shaft, and having different diameters and registering at least partly with each other. The shafts are designed and arranged in a manner such that at least a portion of the wheels may engage the recess. Means are provided for a relative transverse movement of said shafts in one direction and in the opposite direction to selectively bring into contact the first of the wheels with at least a fraction of one of the cylindrical surfaces on a plate, to ensure the drive of the driven shaft in a predetermined direction, or else the second wheel into contact with at least a fraction of the other cylindrical surface formed by the recess in the plate to provide for the drive of the driven shaft in a direction opposed to the last-mentioned direction of rotation, whereas the direction of rotation of the driving shaft remains invariable.

Other features and advantages of a transmission system in accordance with the present invention will be better understood as described in the following specification and appended claims, in conjunction with the following drawing in which:

FIG. 1 is a fragmentary elevation view in section of a transmission system according to the invention;
FIG. 2 is a fragmentary elevation view in section of another embodiment of a transmission system in FIG. 1.

The arrangement illustrated includes a driving shaft I revolvably carried in a plate $p1$ and controlled by a motor, not illustrated, which rotates in an unvarying direction. Two wheels 1 and 2 are coaxially fitted on the lower end of the driving shaft and a plate 3 is provided with an annular recess bounded by two coaxial cylindrical surfaces 4a and 5a and is coaxially rigid with a driven shaft II revolvably carried in a plate $p2$ and of which it may be desired to reverse the direction of rotation without modifying the speed of rotation of the shaft II.

In the embodiment illustrated, the wheels 1 and 2 are of different diameters and are made of metal. The cylindrical surfaces 4a and 5a formed in the plate 3 are lined by yieldable rings 4 and 5, made, for example, of rubber or plastic material. The inner diameter of the ring 4 and the outer diameter of the ring 5 satisfy the following relationship:

$$D1D3=D2D4$$

D1, D2, D3, D4 designating the diameters of the kinematically operative sections, respectively, of the wheels 1 and 2 and the rings 4 and 5.

The end of the shaft I carrying the wheels 1 and 2 projects into the space extending between the rings 4 and 5 by an amount such that when the relative position of the shafts I and II is that illustrated in the drawing, only the wheel 1 is in contact with the inner surface of the ring 4. When, in contradistinction, the shaft I is shifted in the direction of the arrow $f1$ of the drawing, for instance, upon movement of the plate $p1$ which is adapted to slide or to rotate round an eccentric point with reference to the shaft I in a direction extending transversely with reference to the shaft II, the wheel 2 engages the outer surface of the ring 5. In this latter position, the driven shaft II revolves in a direction opposed to that precedingly referred to, but with the same speed.

Obviously, it is also possible to shift the plate $p1$ into a position such that neither the wheel 1 nor the wheel 2 is in contact with the corresponding yielding ring on the plate 3, so that said plate and its shaft II remain stationary.

A second embodiment of a transmission system according to the invention is illustrated in FIG. 2. In this embodiment a rotary shaft I is provided with a gear wheel or gear portion 1' and an end gear wheel or gear 2' and is rotatable relative to a plate $P_1'$. The plate can be moved to the position shown in the drawing and in the direction of the arrow $f_1'$.

The transmission comprises a second rotary shaft II' parallel with the other shaft and rotatably mounted on a plate $P_2'$. A plate 3' is fixed to the second shaft and provided with an annular recess coaxial with the first shaft I'. The plate has rings 4' and 5' within the recess each provided with a plurality of gears 4' and 5a' respectively engaged by the gears of gear wheels 1' and 2'.

In the position shown in FIG. 2 the transmission system is uncoupled. The gear wheel 1' can be made to mesh with the gears 4a' and thereby effectively couple the two rotary shafts and when the first shaft I' is moved in the direction of the arrow $f_1'$, the gear wheel 2' can be made to engage the inner gears 5a' so that a different gear ratio of transmission is possible. Thus, the second embodiment of the transmission system according to the invention functions very similarly to the first-described embodiment.

According to a still further modification, the plate $p1$ may be stationary and the plate $p2$ may move, transversely with reference to the shaft I, so as to bring the plate 3 into positions such that it engages selectively through its rings 4 and 5, whether toothed or otherwise, the wheels 1 and 2.

Lastly, it is also possible for the shaft I to act as the driven shaft and the shaft II as the driving shaft.

My invention is obviously not limited to what has been described and illustrated in the drawing and it will be readily understood that it is also possible through operation of said arrangement to make the driven shaft rotate in opposite directions with a different speed ratio for each direction by a suitable selection of the diameters of the wheels 1 and 2 and those of the rings 4 and 5.

What I claim is:

1. A transmission system interconnecting two parallel rotary shafts comprising two wheels rigidly carried at the end of one of said shafts, a plate carried by the end of the other shaft and provided with an annular recess coaxial with said other shaft, and inside which the wheels on said one shaft are housed with a radial clearance, said recess being bounded by two at least partly cylindrical surfaces facing each other and extending coaxially with reference to said other shaft, and means for shifting the two shafts with reference to each other between a position for which the smaller diameter wheel is brought into contacting relationship with the cylindrical surface of a smaller diameter and another position for which the other wheel is brought into contacting relationship with the other cylindrical surface, the diameters of the cylindrical surfaces and of the wheels being selected so as to provide equality in the speed ratio between the two shafts for both said relative positions of said shafts.

2. A transmission system according to claim 1, in which said two wheels comprise peripheral surfaces for cooperating frictionally with said partly cylindrical surfaces when in said contacting relationship.

3. A transmission system according to claim 1, in which said wheels comprise peripheral teeth and which said partly cylindrical surfaces comprise teeth for meshing with said peripheral teeth during said contacting relationship.

References Cited by the Examiner

UNITED STATES PATENTS

| | | | |
|---|---|---|---|
| 63,614 | 4/67 | Clemens | 74—204 |
| 1,168,290 | 1/16 | Demorest | 74—204 |

DON A. WAITE, *Primary Examiner.*